ELECTRON BEAM FOCUSING SYSTEM

Original Filed April 29, 1953 2 Sheets-Sheet 1

INVENTOR
P. P. CIOFFI
BY Hugh S. Wertz
ATTORNEY

ELECTRON BEAM FOCUSING SYSTEM

Original Filed April 29, 1953 2 Sheets-Sheet 2

INVENTOR
P. P. CIOFFI
BY Hugh S. Liberty
ATTORNEY

United States Patent Office

Re. 25,189
Reissued June 19, 1962

25,189

ELECTRON BEAM FOCUSING SYSTEM

Paul P. Cioffi, Summit, N.J., assignor to Bell Telephone Laboratories, Incorporated, New York, N.Y., a corporation of New York Original No. 2,844,754, dated July 22, 1958, Ser. No. 351,977, Apr. 29, 1953. Application for reissue Dec. 24, 1959, Ser. No. 862,016
22 Claims. (Cl. 315—3.5)

Matter enclosed in heavy brackets [ ] appears in the original patent but forms no part of this reissue specification; matter printed in italics indicates the additions made by reissue.

This invention relates to systems for focusing streams of charged particles, and more particularly, systems for magnetically focusing selectron beams over relatively long paths as are characteristic of traveling wave tubes in which an electron beam is made to flow closely past an interaction wave transmisison circuit a plurality of operating wavelengths long.

In a copending application, Serial No. 351,983, filed April 29, 1953, by J. R. Pierce, *now Pat. No. 2,847,607,* there is analyzed the problem of focusing electron beams in which space charge forces are significant over a relatively long path and there are set forth the advantages for this purpose of utilizing along the path of flow a succession of regions of axially symmetric longitudinal magnetic field regions, characterized in that the direction of the magnetic field reverses along successive regions. The resulting composite field distribution comprising such a succession of magnetic field regions is generally referred to as a spatially alternating magnetic field. The present invention relates in one aspect to improved arrangements for achieving such a succession of magnetic field regions.

In applying the principles set forth by Pierce to the problem of overcoming the space charge forces for focusing an electron beam in a traveling wave tube, it is often found desirable to have a high and uniform periodicity for the successive field regions and also to have the length of the successive field regions relatively short. It may often be onerous or inefficient to meet these requirements by a simple succession of permanent magnets along the beam path.

Accordingly, an object of the present invention is to provide a novel and improved permanent magnet system for achieving a regular succession of axially symmetric longitudinal magnetic field regions of uniform magnetic strength, in which the direction of the magnetic field reverses with successive regions.

A related object of the invention is to facilitate the application to traveling wave tubes of the focusing principles set forth in the above-identified Pierce application.

A further object is to obtain, with a minimum number of magnets, along the path of electron flow in a traveling wave tube a succession of regions of axially symmetric longitudinal magnetic field, the direction of the field reversing with successive regions.

In accordance with one feature of the present invention, apparatus for focusing an electron stream along a predetermined path between an electron gun and target comprises first magnetic means for forming a uniform longitudinal magnetic field parallel to the path along an initial portion of its length, and second magnetic means for forming a spatially alternating magnetic field extending along the major portion of the remainder of the electron path, and includes provision for providing between the uniform field region and the spatially alternating field a transition region.

In accordance with a second feature of the invention, a permanent magnet structure for forming a spatially alternating magnetic field is disposed along the path of flow to have a magnetic axis transverse to the path of electron flow and a succession of pole pieces is arranged along the path of flow in two interleaved sets, the two sets being in magnetic contact with unlike pole faces of the permanent magnet structure whereby successive pole pieces are oppositely poled.

In accordance with another feature of the invention, means are provided for minimizing the axial deviation of the magnetic flux existing in the regions between successive pole pieces.

In an illustrative specific arrangement embodying the distinct features of the invention, there is employed a quadrupole magnetic structure in conjunction with two interleaved and intersecting sets of spaced pole pieces. Each set of pole pieces comprises a linear array of magnetic elements spaced along the path of flow, each element being apertured for passage therethrough the electron flow, and each set of elements extending between a different pair of like poles of the quadrupole structure. Accordingly, successive pole pieces are oppositely poled and there is set up in the gaps between successive pole pieces regions of axially symmetric longitudinal magnetic field, the direction of the longitudinal field reversing with successive regions. A flux guide surrounds the path of electron flow in magnetic contact with successive pole pieces for keeping the magnetic flux in the regions between successive pole pieces in axial alignment.

Such an arrangement for achieving a spatially alternating field permits the convenient realization of as many field regions as desired with a high periodicity. It also makes possible a high degree of axial symmetry in each region together with a high degree of uniformity in the spacing, length, and field intensity of the succession of regions.

The invention will be better understood from the following more detailed description taken in conjunction with the accompanying drawings in which.

Figure 1:
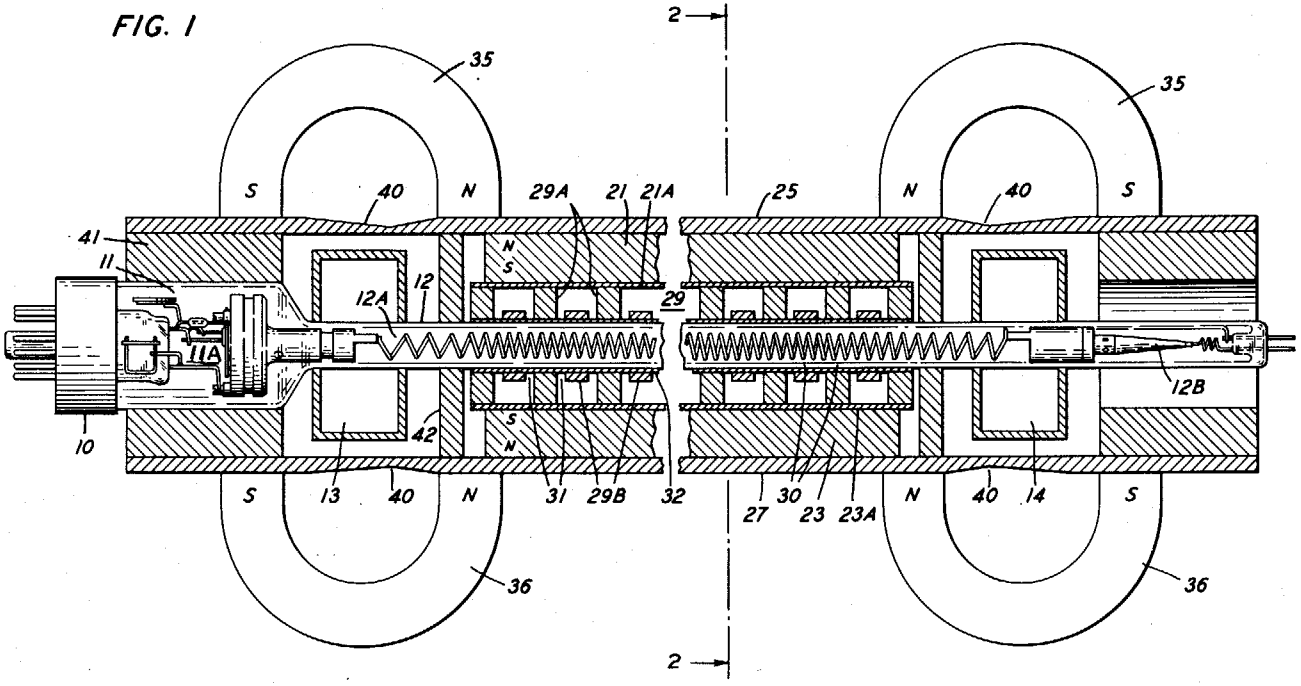
FIG. 1 shows a sectional view of a focussing system which is an illustrative embodiment of the invention being used in conjunction with a traveling wave tube, taken along the tube axis.
Figure 2:
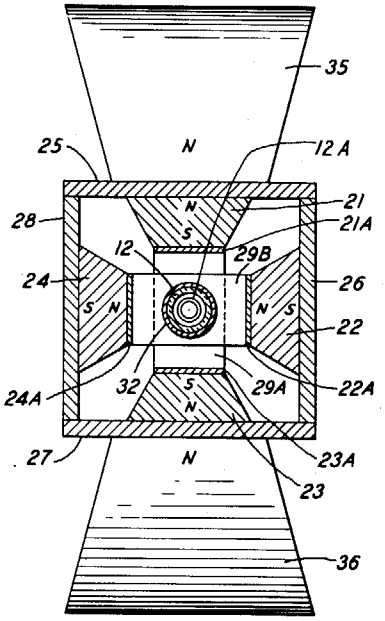
FIG. 2 shows a transverse sectional view taken along lines 2—2 of the arrangement shown in FIG. 1.

It will be convenient, by way of example for purposes of illustration, to describe the invention with particular reference to a traveling wave tube of the kind disclosed in United States Patent 2,575,383 which issued to L. M. Field on November 20, 1951. However, it appears desirable to include no more of the description of this tube than is pertinent to the present invention. With reference now to FIGS. 1 and 2 of the drawings, the traveling wave tube 10 which is of the Field type, includes as portions of the tube glass envelope a bulbous end section 11 which houses the electron gun 11A and an elongated neck section 12 which contains the helix slow wave interaction circuit 12A and a collector electrode 12B in target relation with the electron gun for defining therebetween a longitudinal path of electron flow along the tube axis. Input and output wave guide coupling connections 13 and 14 are provided which extend transverse to the axis of the traveling wave tube (perpendicular to the plane of the paper in the drawing of FIG. 1) in energy exchange relation with the input and output ends of the helix wave interaction circuit.

Figure 3:
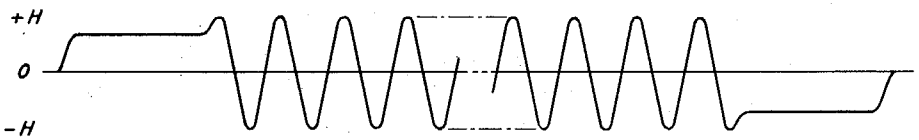
FIG. 3 shows a plot with distance along the tube axis of the magnetic field strength acting on the electron beam flowing along the tube's axis.

As is analyzed in the above-identified Pierce application, focusing of the electron beam past the interaction circuit in its travel from the electron source to the colector can be achieved by a spatially periodically varying ongitudinal magnetic field along the beam path. To this nd, in accordance with one aspect of the present invenon, there extends between the two wave guide conections a quadrupole permanent magnet structure comrising four permanent bar magnets 21, 22, 23 and 24 aving their magnetic axes symmetrically disposed around he tube axis and perpendicular thereto, diametrically pposite pairs of magnets having like poles proximate o the tube axis and adjacent pairs of magnets having unke poles proximate to the tube axis in the manner hown in FIG. 2. An elongated jacket comprising four ectangular plates 25, 26, 27 and 28, of a magnetic maerial formed into a shell of rectangular cross section is in ood magnetic contact with the four pole faces of permanent magnets 21, 22, 23 and 24 remote from the tube xis and serves as the yoke of the quadrupole magnet ormed by the four magnets. The shell is advantageously xternal beyond the ends of the permanent magnets long the entire length of the tube. In accordance with he invention, a regularly spaced succession of pole pieces 9 formed in two interleaved sets 29A and 29B extends long the path of flow in the region between the two vave guide coupling connections 13 and 14. Each pole iece 29 is a substantially identical rectangular parallelpiped extending between the like poles of a pair of iametrically opposite magnets; alternate pole pieces exend between the same pair of magnets and are aligned long the path of flow; adjacent pole pieces extend beween different pairs of magnets and are oriented 90° vith respect to one another. It is generally desirable or improved magnetic contact to position thin rectangular plates 21A, 22A, 23A, 24A flush with the pole faces f permanent magnets 21, 22, 23 and 24, respectively, roximate to the path of electron flow and to have the uccessive pole pieces extend flush across opposing pairs f these plates. Each pole piece has a cylindrical hole 0 passing through its center and the successive holes re in axial alignment with the tube axis and the path f electron flow. Accordingly, since adjacent pole pieces re oppositely polarized, there is set up across the gaps 1 therebetween an axially symmetric longitudinal magetic field region and the direction of this magnetic field egion reverses with succeeding gaps. Accordingly, there s set up along the tube axis and the path of electron ow a succession of corresponding regions of axially ymmetric longitudinal magnetic fields, the direction of he magnetic field reversing with successive regions. The rinciples of the present invention are applicable equally o the problem of focusing a solid or a hollow electron eam. In the case of the solid beam, the strength and eriodicity of the magnetic field is adjusted in accordance vith the principles set forth in the above-mentioned Pierce pplication while for the hollow beam, there are utilized he principles set forth in copending application Serial No. 51,874, filed April 29, 1953, by J. T. Mendel, *now Pat. ,855,537*. In Fig. 3, there is plotted as the ordinate magetic intensity with the distance along the path of flow as he abscissa. It can be seen that along the portion of the eam path corresponding to that lying between the input nd output wave guide connections the magnetic field aries substantially sinusoidally having a period corsponding to twice the mean separation between adjacent ole pieces and to the mean separation between like pole ieces. Additionally, in accordance with another feature f the invention, it is possible to increase the straightness nd axial symmetry of the longitudinal magnetic field egions between successive pole pieces by means of a ux guide 32 extending along the beam path between he input and output wave guide connections. Such a ux guide comprises a thin-walled cylinder of a magetic material, such as iron, which passes through the uccession of pole piece holes in good magnetic contact vith each pole piece and closely surrounds the envelope f tube 10. The walls of the cylinder 32 are made thin and the intensity of magnetization provided by the magnetic structure is adjusted such that the magnetic field in the space enclosed by the flux guide corresponds to the intensity required for operation in accordance with focusing principles set forth in the aforementioned Pierce application. The flux guide serves to reduce the effect of any non-homogeneities of the magnetic structure and of any stray magnetic fields and accordingly reduces any tendencies of the magnetic field to deviate from an axial direction. The general principles applicable are set forth more fully in my Patent 2,807,743, issued September 24, 1957.

Additionally, it is generally desirable to provide some focusing of electron beam during its traversal past the input and output wave guide connections. One of many possible arrangements is here described. Since the same expedients may be employed at the two guide connections 13 and 14, it seems convenient to limit the description to the case of the input wave guide 13 but to designate corresponding elements at the two connections by the same reference numeral. It is first important that the input wave guide connection be of a non-magnetic material, such as copper. A pair of U-shaped magnets 35 and 36 are disposed on opposite sides of the input wave guide connection, with like poles similarly oriented with respect to the direction of electron flow. Each of the permanent magnets 35 and 36 is in good magnetic contact with the corresponding one of rectangular plates 25 and 27 which are extensions of opposite sides of the rectangular shell enclosing the four bar magnets 21, 22, 23 and 24 and which here serve as flux guides between the poles of the U-shaped magnets for achieving a substantially uniform field along the initial portion of the beam path corresponding to passage through the wave guide in accordance with the principles set forth in my aforementioned copending application. In particular, it is desirable to maintain along the greater portion of the beam path extending across the wave guide connection a constant field of intensity substantially equivalent to the root mean square value of the periodically varying field, which subsequently rises in a transition region to the peak value before passing through zero at the beginning of a period of the periodically varying field, as is illustrated in FIG. 3. To this end, it is desirable to adjust in the axial direction the cross-sectional area of the plates 25 and 27 so that the magnetizing force at the resulting magnetization corresponds to the desired field on the axis. The principles applicable are set forth in my above-mentioned copending application. However, in order to achieve the desired rise in the field intensity in the transition region just before entering the region of periodically varying field, the thicknesses of the plates are made a minimum at points 40 closer to the magnetic pole faces adjacent the region of periodically varying field. In this way there is achieved a peaking in the intensity of the magnetic field, as is illustrated in FIG. 3, to a value substantially that of the peak value of the periodically varying field.

Additionally, the bulbous envelope portion 12 is surrounded by an annular permeable member 41 which serves both as a magnetic shield for the electron gun and as one of two pole pieces for establishing the longitudinal magnetic field across the wave guide portion of the electron beam. The permeable plate 42 serves as the oppositely poled pole-piece.

For some applications, the requirements on the spatially periodically varying longitudinal magnetic field can be relaxed sufficiently to permit further simplification of the permanent magnet system shown in FIGURES 1 and 2. In particular, it may be possible to achieve the desired degree of axial symmetry with only a single pair of permanent magnets disposed circumferentially about the path of beam flow.

With reference still to the arrangement shown in FIGURE 2, it can be seen that it should be possible to eliminate two adjacent magnets with no more than some decrease in the intensity of the magnetic field between successive pole pieces and some deterioration in the axial symmetry of this field. The symmetry can be enhanced by rotating one of the two remaining bar magnets 90° around the tube axis to be diametrically opposite the other remaining bar magnet with unlike pole faces proximate the tube axis. Additionally, in such a case it would be desirable to shorten the pole pieces of each set to avoid contact with the pole face of the oppositely positioned bar magnet.

Figure 4:
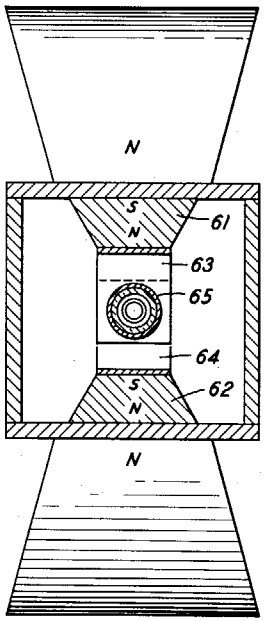
FIG. 4 shows a transverse sectional view of a modification of the focusing system shown in FIGS. 1 and 2.

FIGURE 4 shows the resulting arrangement. Diametrically oppositely disposed along the two axes there will be two bar magnets 61 and 62, with their magnetic axes perpendicular to the tube axis and having unlike poles proximate the tube axis. Two sets of pole pieces 63 and 64, each set extending from a pole face of one magnet towards but not reaching the unlike pole face of the other magnet, are disposed in a linear array along the tube axis, each pole piece being apertured as before for passage therethrough of the electron flow. The two sets of pole pieces are interleaved to form an interdigital pattern whereby adjacent pole pieces are oppositely poled to provide a reversal in the direction of the longitudinal magnetic field extending between adjacent pole pieces. In other respects, this focusing arrangement resembles that shown in FIGURES 1 and 2. Here too, it will usually be advantageous to employ a flux guide 65 around the glass envelope of the tube in good magnetic contact with the successive pole pieces for increasing the straightness of the magnetic field between successive pole pieces. Moreover, the same expedients can be employed for focusing the electron beam during traversal of the input and output wave guide portions of the electron stream path.

It should be evident that various other modifications are possible without departing from the spirit and scope of the invention. For example, the number of permanent bar magnets circumferentially disposed can be increased rather than decreased from that shown in FIGURES 1 and 2. Additionally, it is consistent to employ in place of a pair of bar magnets a U-shaped magnet disposed so that its magnetic axis is transverse to the path of flow and its two unlike pole faces are each proximate to the path of flow. Additionally, it is possible to utilize the pole pieces to load a hollow wave guide and thereby provide a slow wave circuit in the manner described in a copending application Serial No. 351,983, filed April 29, 1953, by J. R. Pierce. This is especially true of the interdigital array of pole pieces of the structure shown in FIGURE 4, since interdigital structures are now well known as slow wave circuits for traveling wave tube use.

What is claimed is:

1. In an electron discharge tube, an electron source and target within said tube defining a path of electron flow between said source and target, first and second permanent magnets disposed around and extending longitudinally along the path of flow, the magnetic axis of each of said permanent magnets being substantially perpendicular to said path and the two magnets having unlike poles adjacent the path of flow, a succession of pole pieces spaced apart along the path of flow forming first and second interleaved sets of pole pieces, said first and second sets in magnetic contact with the first and second permanent magnets, respectively, and each of said sets extending transverse to the path of electron flow, whereby adjacent pole pieces are of unlike polarity along the path of electron flow, and flux guiding means surrounding the path of flow in magnetic contact with and extending between successive pole pieces for aligning the flux in the gap between said successive pole pieces.

2. In an electron beam system, means forming a path of electron flow, first and second permanent magnets extending longitudinally along the path of flow, the magnetic axis of each of said permanent magnets being substantially perpendicular to said path and the two magnets having unlike poles adjacent the electron path, and a succession of longitudinally spaced pole pieces forming first and second interleaved sets of pole pieces, said first and second sets being aligned along the path of flow and extending laterally in magnetic contact with the first and second permanent magnets, respectively, for forming a time-constant spatially-alternating magnetic field along the path of electron flow.

3. In an electron beam system, means defining a path of electron flow, first and second permanent magnets extending longitudinally along the path of flow, the magnetic axis of each of said permanent magnets being substantially perpendicular to said path and the two magnets having unlike poles adjacent the electron path, and a succession of longitudinally spaced pole pieces each apertured for passage therethrough of the electron flow and forming first and second interleaved sets of pole pieces, said first and second sets being aligned along the path of flow and extending laterally in magnetic contact with first and second permanent magnets, respectively, for forming a time-constant spatially-alternating magnetic field along the path of electron flow.

4. In an electron beam system, means forming a path of electron flow, a permanent magnet structure extending along the path of flow having a magnetic axis transverse to the path of flow and a pair of longitudinally extending unlike pole faces adjacent the path of flow, and a plurality of longitudinally spaced pole pieces extending transversely and forming two interleaved sets of pole pieces, each set in magnetic contact with and extending from one of said unlike pole faces of the magnetic structure whereby successive pole pieces are oppositely poled.

5. In an electron beam system, means forming an electron stream, a permanent magnet structure extending along the path of flow having a magnetic axis transverse to the path of flow and a pair of longitudinally extending unlike pole faces adjacent said electron stream, a succession of pole pieces spaced apart along the path of electron flow forming two interleaved sets of pole pieces, each of said pole pieces having an aperture and said apertures axially aligned for passage of the electron stream, each of said two sets being in magnetic contact with one of said unlike pole faces of the permanent magnet structure, and flux guiding means surrounding the electron stream in magnetic contact with and extending between successive pole pieces for aligning the flux in the gaps between adjacent pole pieces.

6. In an electron beam system, means forming an electron stream, a permanent magnet structure comprising a plurality of bar magnets disposed longitudinally along the path of electron flow and having their magnetic axes transverse to the path of electron flow and first and second pairs of pole faces adjacent said electron stream, said first pair of opposite polarity to said second pair, a succession of laterally extending pole pieces spaced apart along the path of flow forming first and second interleaved sets of pole pieces, said first and second sets in magnetic contact with and extending between said first and second pair of pole faces, respectively, of the permanent magnet structure, the two sets being in magnetic contact with unlike pole faces for forming a time-constant spatially-alternating magnetic field along the path of electron flow.

7. In an electron beam system, means forming an electron beam, a permanent magnet structure comprising a plurality of bar magnets longitudinally disposed along the path of electron flow with their magnetic axis transverse to said path, alternate magnets having like pole faces proximate the path of flow, adjacent magnets having unlike pole faces proximate the path of flow, a succession of transversely extending pole pieces spaced apart along the path of flow forming first and second interleaved sets of pole pieces, the first set in magnetic contact with the pole faces of alternate magnets of north polarity and the second set in magnetic contact with the pole faces of a different group of alternate magnets of south polarity for aintaining successive pole pieces oppositely poled, and ıx guiding means surrounding the path of flow in mag-ɛtic contact with and extending between successive pole eces.

8. In an electron discharge tube, an electron source and rget within said tube defining a path of electron flow, quadrupole magnet structure comprising four perma-ɛnt magnets, said magnets disposed around and extend-g along the path of flow and having the magnetic axis each transverse to the path of flow, alternate magnets ıving like pole faces proximate the path of flow and ljacent magnets having unlike pole faces proximate e path of flow, a succession of laterally extending pole eces disposed along and apertured for the path of elec-on flow and forming two interleaved sets of pole pieces, ıch set in magnetic contact with and extending between different pair of like pole faces of alternate magnets hereby successive pole pieces are oppositely poled.

9. In an electron discharge tube, an electron source ıd target within said tube defining a path of electron ɔw, a quadrupole magnet structure comprising four ɛrmenent magnets, said magnets disposed around and ɛtending along the path of flow and having the magnetic ɛis of each transverse to the path of flow, alternate agnets having like pole faces proximate the path of ɔw and adjacent magnets having unlike pole faces oximate the path of flow, a succession of laterally ex-nding pole pieces disposed along and apertured for the ıth of electron flow and forming two interleaved sets of ɔle pieces, each set in magnetic contact with and ex-nding between a different pair of like pole faces of ternate magnets whereby successive pole pieces are ɔpositely poled, and flux guiding means surrounding e electron stream in magnetic contact with and ex-nding between successive pole pieces for aligning the ɔw in the gaps between adjacent pole pieces.

10. In an electron beam system, means forming an ectron stream, a permanent magnet structure having at ast two unlike pole faces extending longitudinally along ıd proximate to the path of electron flow, a first set longitudinally spaced pole pieces laterally extending ɔm one of said pole faces and a second set of longi-dinally spaced pole pieces laterally extending from a fferent one of said pole faces of unlike polarity, said st and second sets of pole pieces apertured for passage said electron stream and interleaved for forming a time-nstant spatially-alternating magnetic field along the path electron flow.

11. In an electron beam system, means forming an ɛctron stream, a permanent magnet structure having at ast two unlike pole faces extending longitudinally along d proximate to the path of electron flow, and a suc-ssion of pole pieces spaced apart along and surrounding e path of flow forming two interleaved sets of pole ɛces the two sets in magnetic contact with unlike pole ces of the permanent magnet structure whereby succes-ve pole pieces are oppositely poled, flux guiding means tending between adjacent pole pieces and enclosing the ıth of flow for aligning the magnetic flux along portions the path of flow between adjacent pole pieces.

12. In combination a traveling wave tube comprising ɛans forming an electron stream, an interaction circuit r propagating magnetic waves in coupling relation with e electron stream, and a magnetic focusing system r keeping the electron stream aligned with the inter-tion circuit in its travel therepast comprising a quadru-ɛle magnetic circuit disposed around and extending along e path of flow and having first and second pairs of pole ces extending longitudinally along and adjacent the th of flow, the first pair being of north polarity and ɛond pair being of south polarity, a succession of later-y disposed pole pieces spaced apart along the path of w forming first and second interleaved sets of pole ɛces, said first and second sets in magnetic contact with ıd extending between the first and second pair of pole faces, respectively, of the quadrupole magnet structure and flux guiding means surrounding the path of flow in magnetic contact with and extending between successive pole pieces for aligning the flux in the gap between pole pieces.

13. In combination, a traveling wave tube comprising means forming an electron stream, an interaction circuit for propagating electromagnetic waves in coupling relation with the electron stream, and a focusing system for keeping the electron stream in alignment with the interaction circuit in its travel therepast comprising a permanent magnet structure extending along the path of flow having a magnetic axis transverse to the path of flow and a pair of longitudinally extending unlike pole faces adjacent said path of flow, one of said pole pieces being of north polarity and the other of south polarity, a succession of laterally disposed pole pieces, each apertured for passage of the electron stream and spaced apart along the path of flow for forming two interleaved sets of pole pieces, one of said sets being in magnetic contact with the north pole face of the permanent magnet structure and the other set in magnetic contact with the south pole face of said structure, for forming a time-constant spatially-alternating magnetic field along the path of electron flow, and flux guiding means surrounding the electron stream in magnetic contact with and extending between successive pole pieces for aligning the flux in the gap between adjacent pole pieces.

14. In combination, a traveling wave tube comprising means forming an electron stream, an interaction circuit for propagating electromagnetic waves in coupling relation with the electron stream, and a focusing system for keeping the electron stream in alignment with the interaction circuit in its travel therepast comprising a permanent magnet structure extending along the path of flow having a magnetic axis transverse to the path of flow and a pair of longitudinally extending unlike pole faces adjacent said path of flow, one of said pole pieces being of north polarity and the other of south polarity, and a succession of laterally disposed pole pieces, each apertured for passage of the electron stream and spaced apart along the path of flow for forming two interleaved sets of pole pieces, one of said sets being in magnetic contact with the north pole face of the permanent magnet structure and the other set in magnetic contact with the south pole face of said structure, for forming a time-constant spatially-alternating magnetic field along the path of electron flow.

15. In an electron discharge device, an electron source and target spaced apart for defining therebetween a path of electron flow, first magnetic means for forming a unidirectional and substantially parallel magnetic field extending along an initial portion of the path of flow, and second magnetic means for forming a spatially alternating magnetic field along a major portion of the remainder of the path of flow, the spatially alternating field comprising a succession of regions of longitudinal magnetic field wherein the direction of the magnetic field reverses in successive regions, and the magnitude of the magnetic field in the initial unidirectional field region being substantially equal to the root mean square of the field strength along the spatially alternating field.

16. In an electron discharge device, an electron source and target spaced apart for defining therebetween a path of electron flow; first magnetic means for forming a unidirectional and substantially parallel magnetic field along the initial portion of the path of flow adjacent the electron source; second magnetic means for forming a spatially alternating field along the major portion of the remainder of the path of flow following the initial unidirectional field region, said spatially alternating field comprising a succession of regions of longitudinally magnetic field wherein the direction of the magnetic field reverses in successive regions; and third magnetic means for forming a transition region between the initial region and the spatially alternating field, wherein the strength of the magnetic field increases from that of the intial field region to a peak value substantially equal to the peak value of the spatially alternating field.

17. In an electron discharge device, an electron source and target spaced apart for defining therebetween a path of electron flow, first magnetic means for forming a unidirectional and substantially parallel magnetic field along an initial portion of the path of flow adjacent the electron source, and second magnetic means for forming a spatially alternating magnetic field along a major portion of the remainder of the path of flow, said second magnetic means comprising a permanent magnet structure extending along the path of flow having a magnetic axis transverse to the path of flow and a pair of longitudinally extending unlike pole pieces adjacent the path of flow, and a plurality of longitudinally spaced pole pieces extending transversely and forming two interleaved sets of pole pieces, each set in magnetic contact with and extending from one of said unlike pole pieces of magnetic structure whereby said sucecssive pole pieces are oppositely poled and the spatially alternating field comprises a succession of regions of longitudinal magnetic field wherein the direction of the magnetic field reverses in successsive regions, the axial length of the initial unidirectional field region being substantialy longer than the axial length occupied by a field region of said succession.

*18. A magnet system for focusing at least one electron beam in connection with a traveling wave tube and the like, comprising a plurality of focusing magnets disposed serially in a direction paralleling the direction of propagation of the electron beam and surrounding the electron beam for the extent of the focusing path, the directions of the lines of force extending in said magnets perpendicular to the direction of propagation of said electron beam, pole pieces respectively cooperating with said magnets being similarly serially disposed and alternately magnetically interconnected with identical poles thereof, whereby an alternating magnetic field is produced creating along the beam axis a substantially sinusoidal distribution of the magnetic field intensity, said focusing magnets forming along planes extending perpendicular to the electron beam structures exhibiting substantially rectangular configuration surrounding the electron beam, identical poles of said magnets being interconnected by the respective pole pieces cooperating therewith.*

*19. A magnet system according to claim 1, wherein the respective magnet poles extend parallel to one another and parallel to the electron beam.*

*20. A magnet system according to claim 1, wherein said magnets form a structure exhibiting a square configuration in a plane extending perpendicular to the electron beam, said beam passing centrally through said magnets.*

*21. A magnet system according to claim 2, wherein said magnets form a structure exhibiting a square configuration in a plane extending perpendicular to the electron beam, said beam passing centrally through said magnets*

*22. A magnet system according to claim 2, wherein the longitudinal axes of said pole pieces extend in direction perpendicular to the direction of the electron beam.*

References Cited in the file of this patent or the original patent

UNITED STATES PATENTS

| | | |
|---|---|---|
| 2,200,039 | Nicoll | May 7, 194 |
| 2,259,531 | Miller | Oct. 21, 194 |
| 2,300,052 | Lindenblad | Oct. 27, 194 |
| 2,305,884 | Litton | Dec. 22, 194 |
| 2,483,407 | Fremlin | Oct. 4, 194 |
| 2,503,173 | Reisner | Apr. 4, 195 |
| 2,741,718 | Wang | Apr. 10, 195 |

OTHER REFERENCES

Article by E. D. Courant et al., pages 1190–1196 Physical Review for December 1952.